Oct. 11, 1966 H. LOCHER 3,278,842
CAPACITIVE APPARATUS FOR CALIBRATING ELECTRICAL TESTING
DEVICES BY SIMULATING THEIR TEST PROCEDURE
Filed June 18, 1962 2 Sheets-Sheet 1
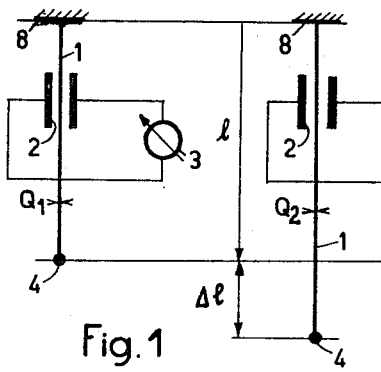
Fig. 1
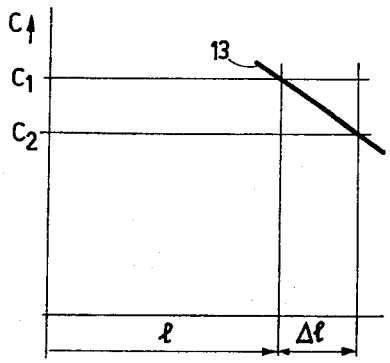
Fig. 2
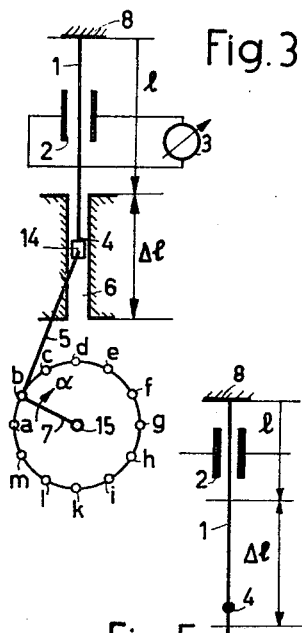
Fig. 3
Fig. 5
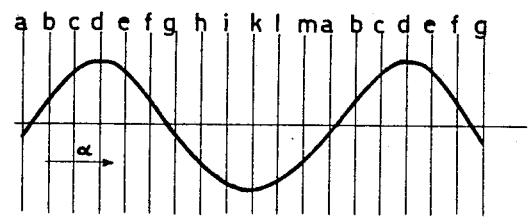
Fig. 4
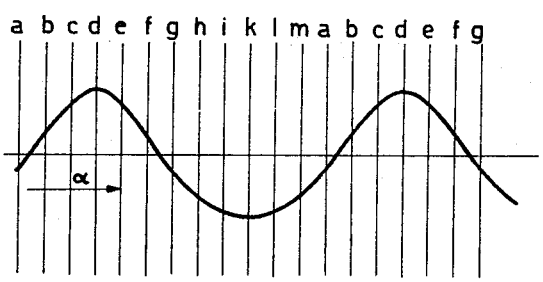
Fig. 6
INVENTOR
HANS LOCHER
BY 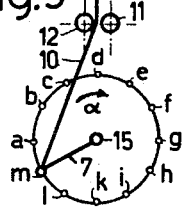
ATTORNEY Oct. 11, 1966  H. LOCHER  3,278,842
CAPACITIVE APPARATUS FOR CALIBRATING ELECTRICAL TESTING
DEVICES BY SIMULATING THEIR TEST PROCEDURE
Filed June 18, 1962                           2 Sheets-Sheet 2

INVENTOR
HANS LOCHER

BY K. A. Mayr
ATTORNEY

United States Patent Office 3,278,842
Patented Oct. 11, 1966

3,278,842
CAPACITIVE APPARATUS FOR CALIBRATING ELECTRICAL TESTING DEVICES BY SIMULATING THEIR TEST PROCEDURE
Hans Locher, Uster, Switzerland, assignor to Zellweger Ltd., Uster Factories for Apparatus and Machines, Uster, Switzerland, a corporation of Switzerland
Filed June 18, 1962, Ser. No. 203,118
Claims priority, application Switzerland, July 14, 1961, 8,328/61
10 Claims. (Cl. 324—61)

This invention relates to a method and apparatus for checking the accuracy of and for calibrating electrical testing devices. More particularly, the invention relates to a method and apparatus used to determine the mean deviation of a variable quantity from its mean value.

There are numerous devices for determining deviations of a variable quantity from its mean value. For example, in the textile industry, devices for the capacitive determination of the cross-sectional areas of materials such as slivers, roving and yarns are known in which, among other things, the mean deviation of the cross-sectional area of the material from its mean value is measured. Experience has shown that the accuracy of the readings of such devices has to be checked.

In one known method for checking the accuracy of such devices a piece of material which is, for example, in the form of an endless strip and which is accurately defined with regard to its cross-sectional area and the variations therein, is moved through the testing apparatus instead of the textile material to be tested. The variations in cross-sectional area may be obtained, for example, by providing a homogeneous strip having a perforation along the strip. However, the accuracy and ability to reproduce the same conditions each time in this method of testing are limited by the fact that the strip varies in flexibility according to the room temperature or humidity as a result of which its position inside the measuring condenser of the testing device is not always the same. Moreover, the arrangement of guide members which guide the strip in a specific position on both sides of the measuring condenser, may influence the result of the testing because the electric field between the plates of the measuring condenser is not precisely homogeneous.

An object of the present invention is to overcome these disadvantages by providing a method for checking the accuracy of electrical testing devices of the type used to determine the mean deviation of a variable quantity from its mean value, such as the testing devices used to determine the cross-sectional area of products of the textile industry. According to the method of the present invention a cord which is resilient and capable of being longitudinally extended is inserted in a measuring apparatus instead of the material to be tested and the cord is then subjected to periodic and varying stretching so that precisely defined variations in cross-sectional areas are produced by the resilient expansion and contraction of the cord in the measuring member.

Another object of the present invention is to provide apparatus for carrying out this method. Such apparatus comprises a resilient cord capable of being extended, means for securing both ends of the cord while it is inserted in a measuring apparatus, and means for subjecting one secured end of the cord to precisely defined movements to thereby produce the necessary precisely defined variations in cross-sectional areas of the cord inside the measuring apparatus.

Other objects and features of the invention will appear as the description progresses. For a better understanding of the invention reference should be had to the accompanying drawings, wherein like numerals of reference indicate similar parts throughout the several views and wherein:

FIG. 1 shows diagrammatically the capacitive measurement of the cross-sectional area of a cord.

FIG. 2 is a graph showing the relationship between variation in length of the cord and variation in capacity.

FIG. 3 shows diagrammatically a crank drive with a rigid connecting rod.

FIG. 4 is a graph showing the stroke-time graph of the crank drive shown in FIG. 3.

FIG. 5 shows diagrammatically a crank drive with a flexible traction cable.

FIG. 6 is a graph showing the stroke-time graph of the crank drive shown in FIG. 5.

Figure 8:
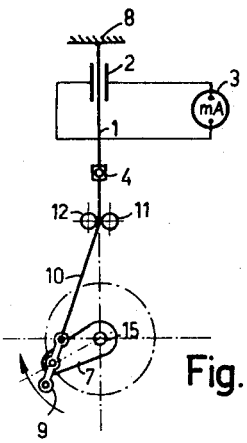

FIG. 8 diagrammatically illustrates a crank drive similar to that shown in FIG. 5 except that an adjusting element is provided for changing the length of the connection.

Figure 9:
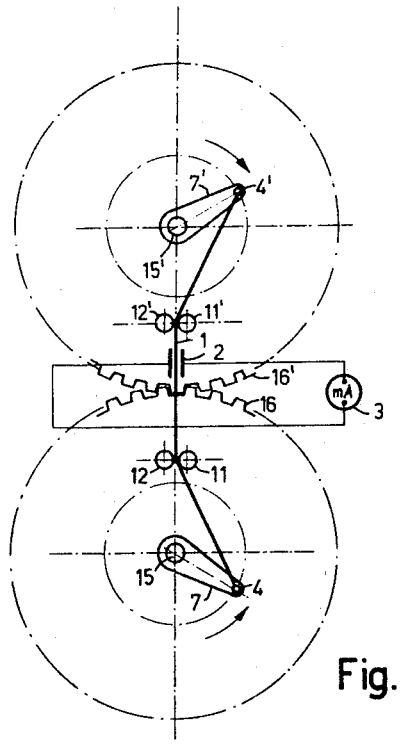

FIG. 9 shows diagrammatically a crank drive for moving both ends of the cord.

Figure 10:
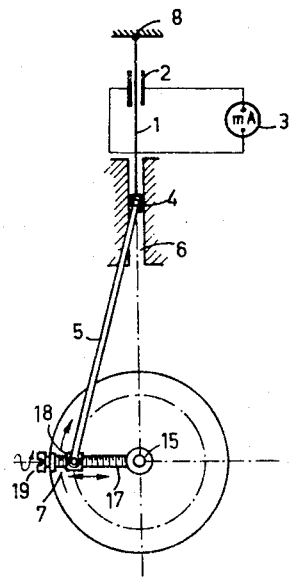

FIG. 10 shows diagrammatically a crank drive in which the stroke of the crank can be changed.

FIG. 1 shows diagrammatically a measuring apparatus 2, which may be for example, an electrical condenser, the capacity of which can be measured by an indicator device 3. The field of the condenser 2 is used for the testing of textile products such as slivers, roving and yarns, the condenser 2 acting as a measuring member through which these products are drawn. For the purpose of checking the accuracy of this testing device, a cord 1 serving as a reference member is inserted in the field of the condenser 2. The cord is capable of resilient longitudinal extension and has one end which is secured to a fixed point of support 8 opposite the measuring means 2. The other end 4 is periodically stretched by the length $\Delta l$ by means of a drive mechanism so that the portion of the cord 1 which is inside the measuring member 2 contracts and expands to produce a variation in the cross-sectional areas as indicated by the values $Q_1$ and $Q_2$ in FIG. 1. The increase in length of the cord 1 caused by the stretching is indicated by $\Delta l$ in FIG. 1. Alternatively, each end of the cord 1 may be held by a drive mechanism, the ends of the cord 1 being moved in opposite directions by the drive mechanism in such a manner that the point of the cord which is in the middle of the measuring member 2 remains substantially at rest. The cord 1 may be made of rubber or fibrous material.

As a result of stretching the capacity C of the condenser 2 as indicated by the indicating device 3 varies $\Delta C$ between the values $C_1$ and $C_2$.

In FIGURE 2, the variation in capacity $\Delta C$ between $C_1$ and $C_2$ is illustrated as a function of the variation in length $\Delta l$ of the cord 1. Deformation of the cord 1 can be determined from the straight and reproducible curve 13. If the cord 1 were permanently deformed by stretching the cord by an amount equal to $\Delta l$, the initial value $C_1$ could no longer be obtained thereby resulting in a flatter curve 13.

This principle of operation of an apparatus constructed according to the present invention is again shown in FIGURE 3 wherein the end 4 of the cord 1 is moved up and down in a guide 6. In this case, a crank 7 rotates at a constant angular speed about a shaft 15 and the crank 7 moves a sliding block 14 in the guide 6. The end 4 of the cord 1 is secured to the block 14. The result of such an arrangement is shown in FIGURE 4, wherein the variation in length $\Delta l$ is shown on a curve as a function of the crank $\alpha$. The result is a substantially sinusoidal curve indicating the variations in cross-sectional areas of the cord 1 and hence the variation in capacity ΔC.

A similar arrangement is shown in FIGURE 5 in which the end 4 of the cord 1 is connected to a crank 7 by means of a flexible but inelastic connection 10. Two guide rollers 11, 12 serve to restrain the deflection of the connection 10 and to insure that the end 4 of the cord 1 always moves up and down in the same plane.

FIGURE 6 shows the variation in capacity resulting from the arrangement of FIGURE 5. The curve in FIGURE 6 is distorted from a true sinusoidal curve because the guide rollers 11, 12 are set fairly close to the crank 7.

Figure 7:
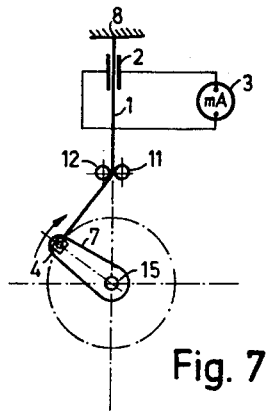
FIG. 7 shows diagrammatically a crank drive in which the cord is connected directly to the crank.

As a further possible construction the end 4 of the cord 1 may be connected directly to the end of the crank 7 as shown in FIGURE 7. In this case there is no inelastic connection element 10 and the guide rollers 11, 12 should not offer any appreciable frictional resistance to the cord 1 so that it is possible to obtain the same degree of stretching over the whole length of the cord 1.

These devices may also be constructed with a symmetrical arrangement, in relation to the measuring member 2, of drive means for the above-mentioned movement of both ends of the cord 1. This is shown in FIGURE 9 which illustrates a symmetric arrangement of the cranks 7 and 7′ which elongate the cord 1. Rotation of the cranks in opposite direction is initiated by gears 16 and 16′. In order not to obscure the drawing, the condenser 2 is not shown in the middle between the guides 11, 12 and 11′, 12′, because in that position the condenser would coincide with the gears 16 and 16′.

The curve of the capacity variations ΔC as a function of the crank position α is not critical in itself because the instantaneous value of deviation from the mean value is determined on the devices on a test run. Nevertheless, the deviation can be accurately calculated mathematically. In the testing of textile material, such mean deviations may range up to 30 percent, and down to 1 percent or less as a lower limit. In order to be able to simulate such differences in the mean deviations on devices suitable for this range, the stroke of the crank 7 may be varied in dimensions for example, so that as a result the variation in length Δl and hence the variation in capacity ΔC can be varied within wide limits.

FIGURE 10 illustrates an arrangement whereby the stroke of the crank 7 can be changed. The arm 17 is threaded and carries a nut 18 to which the contacting rod 5 is pivotally connected. The arm 17 has a head 19 affording rotation of the arm and displacement of the nut 18 for changing the length of the active arm.

Another means for controlling the measuring range is shown in FIGURE 8 and consists in bringing the length "l" of the unstretched cord 1 into a certain relationship to the stroke of the crank 7 and bridging the distance between the cord end 4, thus determined, and the end of the crank 7 by means of a connection 10 which is flexible but inelastic in a longitudinal direction similar to the connection 10 in FIGURE 5. FIGURE 8 illustrates this last mentioned feature and shows an adjusting element 9 provided for changing the length of the connection 10.

The method according to the present invention can be applied, according to the above description, so that the variation in cross-sectional areas produces precisely reproducible and mathematically defined reference values in terms of capacitance. The principles of the present invention may also be applied to other measuring systems in which the measuring means determines the quantities to be measured, for example magnetically, ohmically, optically, pneumatically, hydraulically or by radiation means.

Not ony purely sinusoidal variations in cross section but also those with any desired proportion of harmonics can be produced by use of the method according to the present invention. If the simple crank 7 as shown in FIGURE 3 or FIGURE 5 is replaced by a crank drive which follows certain mathematical laws, then considerably more complicated forms of variations in cross-sectional areas and capacity can be simulated.

I claim:
1. In an electrical measuring apparatus for measuring the mean deviation of the cross-sectional area of threadlike material, particularly of textile material, from the mean value of said area, said measuring device comprising:
   a capacitor,
   an oblong resilient member,
   means for temporarily securing a straight length portion of said resilient member between the plates of said capacitor for temporarily replacing the threadlike material,
   means for subjecting said straight length portion of said resilient member to predetermined stretching and contracting movements for producing predetermined and defined variations in cross-sectional area of said straight length portion which variations cause fluctuations in the capacitance of said capacitor, which fluctuations act as reference values for measuring the mean deviations of the cross-sectional area of the threadlike material from the mean value of said cross-sectional area.

2. In an electrical measuring device including measuring means capable of indicating a variable quantity, particularly variable cross-sectional areas of textile material, said apparatus comprising a capacitor having an electrical field:
   an oblong resilient member,
   means for temporarily securing a straight length portion of said member in said electrical field in lieu of the textile material, said securing means including means for securing one end of said resilient member in fixed position relative to said measuring means, and
   means for moving the second end of said resilient member for alternating by expanding and contracting said resilient member and producing defined variations in cross-sectional area of said straight length portion which variations cause fluctuations in said electrical field, which variations are reference values for calibrating said measuring device.

3. Apparatus as set forth in claim 2 wherein said resilient member is a cord of resilient rubber.

4. Apparatus as set forth in claim 2 wherein said resilient member is made of fibrous material.

5. In an electrical measuring device as defined in claim 2 and wherein said means for moving the second end of said resilient member includes guide means for guiding said second end to move on a straight path, and a crank arm and connecting-rod arrangement connected to said guide means for imparting linear movement to said second end upon rotary movement of said crank arm.

6. In an electrical measuring device as defined in claim 2 and wherein said means for moving the second end of said resilient member includes an oblong flexible member having a first end secured to the second end of said resilient member, guide means for aligning the portion of said flexible member which is adjacent to said first end of said flexible member with said resilient member, said flexible member having a second end, and a rotatable crank arm secured to said second end of said flexible member.

7. In an electrical measuring device according to claim 6, means for varying the length of said flexible member.

8. In an electrical measuring device as defined in claim 2 and wherein said means for moving the second end of said resilient member includes a rotatable crank arm connected to said second end, guide means being provided for guiding said resilient member to move on a straight path between said first end of said resilient member and said guide means.

9. In an electrical measuring device as defined in claim 2 and wherein said means for moving the second end of said resilient member includes guide means for guiding said second end to move on a straight path, a connecting rod having one end movably connected to said guide means, a rotatable crank arm, and means for movably connecting the second end of said connecting rod to said crank arm, said last mentioned means including means for adjusting the position on said crank arm of said means for movably connecting the second end of said connecting rod to said crank arm.

10. In an apparatus for measuring the mean deviation of the cross-sectional area of threadlike material, particularly of textile material, from the mean value of said area, said apparatus comprising a capacitor having an electrical field:
- an oblong resilient member,
- means for temporarily securing a straight length portion of said resilient member in said electrical field for temporarily replacing the threadlike material, and
- means for moving the ends of said resilient member in opposite directions for alternatingly expanding and contracting said resilient member for producing predetermined and defined variations in cross-sectional area of said straight length portion which variations cause fluctuations in said electrical field, which variations are reference values for measuring the mean deviations of the cross-sectional area of the threadlike material from the mean value of said cross-sectional area.

References Cited by the Examiner
UNITED STATES PATENTS

| | | | |
|---|---|---|---|
| 2,350,722 | 6/1944 | Buckingham | 73—91 |
| 2,612,040 | 9/1952 | Rhodes | 73—92 |
| 3,062,044 | 11/1962 | Jonson | 73—91 |

WALTER L. CARLSON, *Primary Examiner.*

JAMES W. LAWRENCE, *Examiner.*

C. A. S. HAMRICK, W. H. BUCKLER,
*Assistant Examiners.*